United States Patent
Chiu et al.

(10) Patent No.: US 9,869,970 B2
(45) Date of Patent: Jan. 16, 2018

(54) HOLOGRAM MODULE, DISPLAY DEVICE HAVING THE SAME AND WEARING DEVICE HAVING THE SAME

(71) Applicant: WISTRON CORP., New Taipei (TW)

(72) Inventors: Yu-Wei Chiu, New Taipei (TW); Wen-Kuong Liu, New Taipei (TW)

(73) Assignee: WISTRON CORP., New Taipei (TW)

( * ) Notice: Subject to any disclaimer, the term of this patent is extended or adjusted under 35 U.S.C. 154(b) by 167 days.

(21) Appl. No.: 14/736,182

(22) Filed: Jun. 10, 2015

(65) Prior Publication Data

US 2016/0231707 A1  Aug. 11, 2016

(30) Foreign Application Priority Data

Feb. 17, 2015  (TW) .............................. 104105617 A

(51) Int. Cl.

| | | |
|---|---|---|
| *G03H 1/22* | (2006.01) | |
| *G03H 1/24* | (2006.01) | |
| *G03H 1/02* | (2006.01) | |
| *G03H 1/00* | (2006.01) | |
| *G03H 1/26* | (2006.01) | |

(52) U.S. Cl.
CPC ......... *G03H 1/2249* (2013.01); *G03H 1/0256* (2013.01); *G03H 1/2286* (2013.01);
(Continued)

(58) Field of Classification Search
CPC ...... G03H 1/2249; G03H 1/0256; G03H 1/24; G03H 2001/2615; G03H 2001/0055;
(Continued)

(56) References Cited

U.S. PATENT DOCUMENTS 5,422,744 A * 6/1995 Katz ...................... G03H 1/041
235/440
2006/0221021 A1  10/2006 Hajjar et al.
(Continued)

FOREIGN PATENT DOCUMENTS

CN     2567102 Y    8/2003
CN   101251651 B    5/2010
(Continued)

OTHER PUBLICATIONS

A Short Introduction to Barcodes by Barcode Software Center, (Apr. 11, 2001, p. 1) (https://web.archive.org/web/20010411054720/http://www.mecsw.com/info/intro.html).*
(Continued)

*Primary Examiner* — Jade R Chwasz
*Assistant Examiner* — Jyotsna Dabbi
(74) *Attorney, Agent, or Firm* — Maschoff Brennan

(57) ABSTRACT

A hologram module includes a phosphor layer and a rainbow hologram sheet. The phosphor layer has a phosphor array structure. The rainbow hologram sheet has a first display layer and a second display layer. The first display layer is disposed on the phosphor layer and has a first barcode array corresponding to the phosphor array structure. The second display layer is disposed on the first display layer and has a second barcode array corresponding to the first barcode array. The phosphor array structure, the first barcode array and the second barcode array are chromatic. A color of the phosphor array structure meets with a color combined by the first barcode array and the second barcode array so as to display a hologram image converted from light emitted by the phosphor array structure via the first and second barcode arrays.

11 Claims, 5 Drawing Sheets

(52) U.S. Cl.
CPC ....... *G03H 1/24* (2013.01); *G03H 2001/0055* (2013.01); *G03H 2001/2268* (2013.01); *G03H 2001/2615* (2013.01); *G03H 2210/53* (2013.01)

(58) Field of Classification Search
CPC ............. G03H 1/2268; G03H 2210/53; G03H 2001/2268; G06K 9/00; G06K 9/004; G06K 19/06028; G06K 19/06065; G06K 19/16; G06K 19/0614; G06K 7/1404–7/1426; G06K 7/62; G06K 7/46
USPC ........................................ 359/32; 349/70–71
See application file for complete search history.

(56) References Cited

U.S. PATENT DOCUMENTS

| | | | |
|---|---|---|---|
| 2010/0327185 A1 | 12/2010 | Kindler et al. | |
| 2012/0211566 A1* | 8/2012 | Hensel | G06K 7/10732 235/462.42 |
| 2015/0118124 A1* | 4/2015 | Khorasaninejad | B82Y 15/00 422/429 |
| 2015/0153023 A1* | 6/2015 | Jepsen | F21V 13/02 362/602 |

FOREIGN PATENT DOCUMENTS

| | | |
|---|---|---|
| CN | 101817282 A | 9/2010 |
| CN | 103383520 A | 11/2013 |
| CN | 103676163 A | 3/2014 |

OTHER PUBLICATIONS

Taiwan Office Action dated Jun. 7, 2016 in application No. 104105617.

* cited by examiner

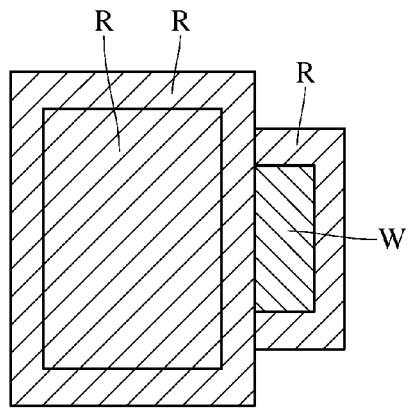
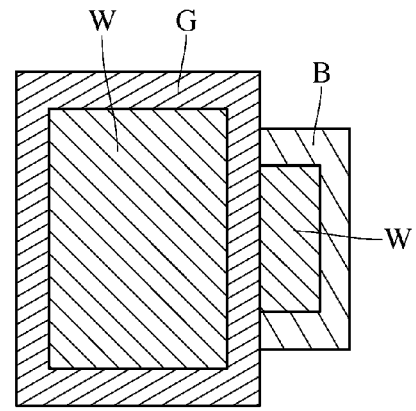
FIG. 5    FIG. 6
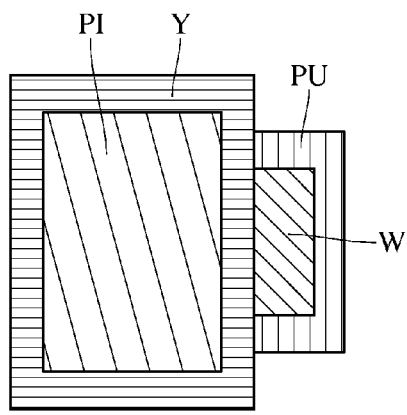
FIG. 7

HOLOGRAM MODULE, DISPLAY DEVICE HAVING THE SAME AND WEARING DEVICE HAVING THE SAME

CROSS-REFERENCE TO RELATED APPLICATIONS

This non-provisional application claims priority under 35 U.S.C. §119(a) on Patent Application No(s). 104105617 filed in Taiwan, R.O.C. on Feb. 17, 2015, the entire contents of which are hereby incorporated by reference.

TECHNICAL FIELD

The disclosure relates to a hologram module, and more particularly to a hologram module, a display device having the same and a wearable device having the same.

BACKGROUND

In recent years, with the development of technology, efficiencies of electronic devices are enhanced accordingly. However, the improved performances of electronic devices are not the only factor that can increase the demand of consumers for the electronic devices. For example, developers have designed a tablet computer for being demountably combined with a keyboard to have multiple kinds of using conditions. Thus, users can adjust current using conditions of the tablet computers according to actual requirement. For example, the combination of tablet computer and keyboard can be adjusted to flip over to function as a tablet or a laptop computer, and thus the current using condition is suitable for users to operate them. In addition, some developers have improved the appearances of electronic devices for attracting consumers to purchase the electronic devices with a more aesthetic design.

According to the above description, it is understood that developers have been trying to increase the desire of consumers to purchase the electronic devices. However, the foregoing manners are not effective enough to attract consumers to purchase their products. Hence, developers have been developing other designs to increase the demand for their products.

SUMMARY

One aspect of the disclosure provides a hologram module including a phosphor layer and a rainbow hologram sheet. The phosphor layer has a phosphor array structure. The rainbow hologram sheet has a first display layer and a second display layer. The first display layer is disposed on the phosphor layer and has a first barcode array corresponding to the phosphor array structure. The second display layer is disposed on the first display layer and has a second barcode array corresponding to the first barcode array. The phosphor array structure, the first barcode array and the second barcode array are chromatic. A color of the phosphor array structure meets with a color combined by the first barcode array and the second barcode array so as to display a hologram image converted from light emitted by the phosphor array structure via the first barcode array and the second barcode array.

Another aspect of the disclosure provides a display device including a display body and a hologram module. The display body has a light source. The hologram module includes a phosphor layer and a rainbow hologram sheet. The phosphor layer is disposed on the display body and has a phosphor array structure corresponding to the light source. The rainbow hologram sheet includes a first display layer and a second display layer. The first display layer is disposed on the phosphor layer and has a first barcode array corresponding to the phosphor array structure. The second display layer is disposed on the first display layer and has a second barcode array corresponding to the first barcode array. The phosphor array structure, the first barcode array and the second barcode array are chromatic. A color of the phosphor array structure meets with a color combined by the first barcode array and the second barcode array. The light source is for emitting light to excite the phosphor array structure to emit phosphorescent light that illuminates the first barcode array and the second barcode array to display a holographic and chromatic image.

Yet another aspect of the disclosure provides a wearable device including a display body and a hologram module. The display body has a light source. The hologram module includes a phosphor layer and a rainbow hologram sheet. The phosphor layer has a phosphor array structure corresponding to the light source. The rainbow hologram sheet includes a first display layer and a second display layer. The first display layer is disposed on the phosphor layer and has a first barcode array corresponding to the phosphor array structure. The second display layer is disposed on the first display layer and has a second barcode array corresponding to the first barcode array. The phosphor array structure, the first barcode array and the second barcode array are chromatic. A color of the phosphor array structure meets with a color combined by the first barcode array and the second barcode array. The light source is for emitting light to excite the phosphor array structure to emit phosphorescent light that illuminates the first barcode array and the second barcode array to display a holographic and chromatic image.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 5 is an illustration of an image formed by the rainbow hologram sheet in FIG. 2;

FIG. 6 is an illustration of an image formed by the phosphor layer in FIG. 2;

FIG. 7 is an illustration of a combined image formed by the phosphor layer and the rainbow hologram sheet in FIG. 2.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
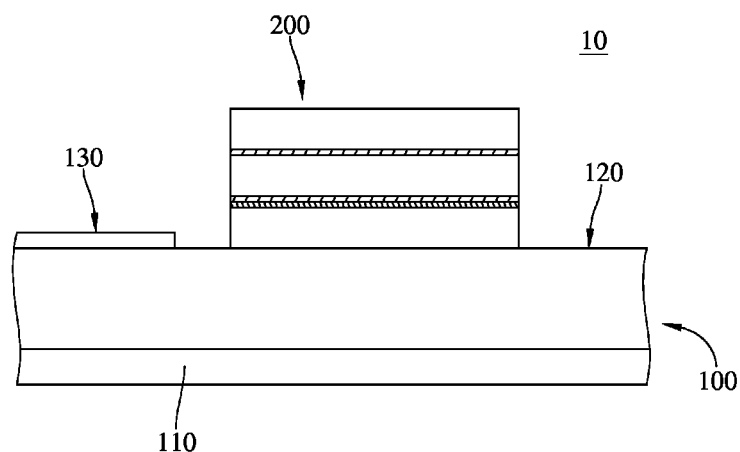
FIG. 1 is a schematic side view of a display device according to a first embodiment of the disclosure.
Figure 2:
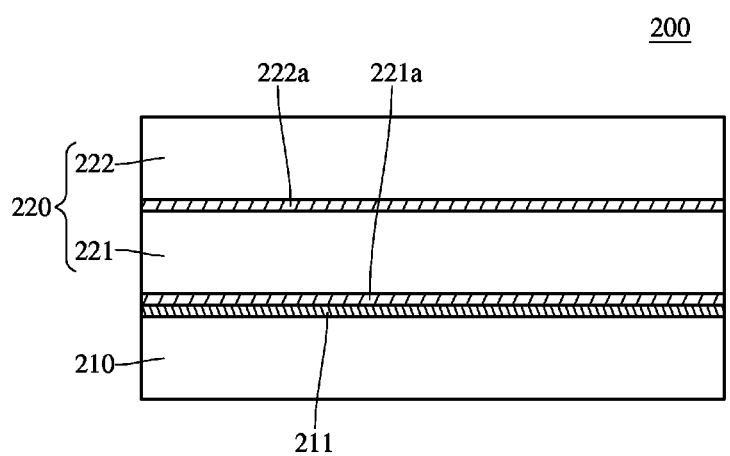
FIG. 2 is a schematic side view of a hologram module in FIG. 1.
Figure 3:
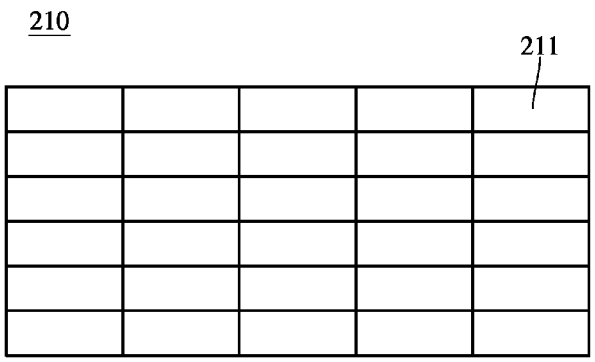
FIG. 3 is a schematic top view of a phosphor layer in FIG. 2.

Please refer to FIG. 1, FIG. 2 and FIG. 3. FIG. 1 is a schematic side view of a display device according to a first embodiment of the disclosure, FIG. 2 is a schematic side view of a hologram module in FIG. 1, and FIG. 3 is a schematic top view of a phosphor layer in FIG. 2. As shown in FIG. 1, the display device 10, according to this embodiment, includes a display body 100 and a hologram module 200. For example, the display body 100 is a display utilized in a tablet computer, a cell phone or a wearable device. The display body 100 has a display surface 120, a non-display surface 130 and a light source 110. For example, the non-display surface 130 is a surface of an outer casing that surrounds the display surface 120. In other words, the non-display surface 130 is located at the periphery of the display surface 120. For example, the light source 110 is a back-light module or an active-matrix organic light-emitting diode (AMOLED). In addition, the light source 110 is located inside the display body 100 and illuminates the display surface 120.

As shown in FIG. 2 and FIG. 3, the hologram module 200 includes a phosphor layer 210 and a rainbow hologram sheet 220. The phosphor layer 210 is disposed on the display surface 120 of the display body 100. The phosphor layer 210 includes a phosphor array structure 211. The phosphor layer 210 is able to be pervious to light, and the phosphor array structure 211 corresponds to the light source 110 such that the light source 110 of the display device 10 is able to illuminate the phosphor array structure 211. In other words, the light source 110 emits light to the phosphor array structure 211.

One embodiment of a method for manufacturing the phosphor layer 210 is described as follows. For example, first, a phosphorus solvent with multiple colors are painted or coated on a material that is pervious to light. For example, the material is glass, polymer, ceramics or metal, all of which are pervious to light. When the phosphorus solvent disposed on the material is solidified, a phosphor array structure 211 with multiple colors is formed on the material. Moreover, the phosphor array structure 211 is chromatic or with multiple colors.

Figure 4:
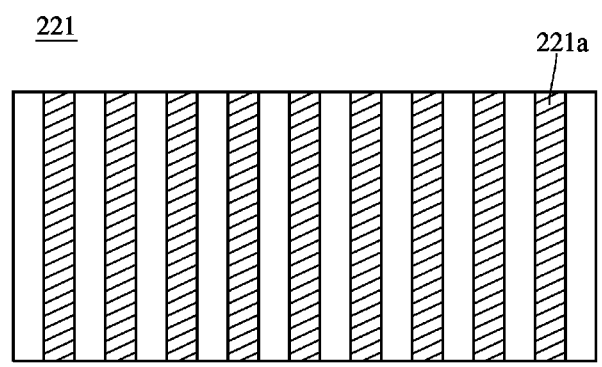
FIG. 4 is a first display layer of a rainbow hologram sheet in FIG. 2.

As shown in FIG. 2 and FIG. 4, the rainbow hologram sheet 220 includes a first display layer 221 and a second display layer 222. The first display layer 221 is disposed on the phosphor layer 210. The first display layer 221 includes a first barcode array 221a which corresponds to the phosphor array structure 211. The second display layer 222 is disposed on the first display layer 221. The second display layer 222 includes a second barcode array 222a which corresponds to the first barcode array 221a. Furthermore, the first display layer 221 and the second display layer 222 are able to be pervious to light. A color of the phosphor array structure 211 meets with a color combined by the first barcode array 221a and the second barcode array 222a so as to display a hologram image converted from light emitted by the phosphor array structure 211 of the phosphor layer 210 via the first barcode array 221a and the second barcode array 222a.

One embodiment of a method for manufacturing the first display layer 221 is described as follows. For example, a light source 110 which can emit visible light (i.e., the wavelength is between 380 nanometers (nm) and 780 nm or ultra-violet light (i.e., the wavelength is between 380 nm) is adopted. The visible light or the ultra-violet light can pass through a grating to form a digital barcode with multiple parallel lines. The digital barcode is able to represent data which are stored by a computer or a processor. Then, the digital barcode is printed by laser to be outputted on a substrate which is pervious to light so as to form a first barcode array 221a on a phosphor array structure 211. The substrate is, for example, glass, polymer, ceramic or metal, all of which are pervious to light. In detail, a color of the first barcode array 221a meets with a color of the phosphor array structure 211. Accordingly, the method for manufacturing the first display layer 221 is finished. The method for manufacturing the second display layer 222 is the same as that of the first display layer 221, so it will not be repeated herein again.

Moreover, the grating is manufactured by semiconductor technology, so the diameter of the grating can be below 260 nm. Accordingly, the density of the first barcode array 221a is increased, so the storage volume of data can be increased such that the barcode array can become a mega data storage, which means its storage volume can be increased from 10 gigabytes (G) to 100 G. Thus, the display quality and color gamut of the hologram module 200 are enhanced. In this disclosure, mega data storage is defined as in the same volume, the surface area of a first barcode array 221a can store a great amount of data, e.g., 20 G. When the wavelength is shorter, more light can pass through the grating. Accordingly, the mega data storage can expand to multiple layers, which means more and more data can be stored inside.

The principle of the display of the hologram module 200 is described as follows. When the display device 10 has enough power, the light source 110 of the display device 10 is able to illuminate the phosphor array structure 211 of the phosphor layer 210. The phosphor array structure 211 of the phosphor layer 210 is able to store the energy of light in order to emit phosphorescent light when the power of display device 10 is completely exhausted or is in a power-saving mode. Thus, the phosphor array structure 211 which emits the phosphorescent light is considered a light source for the hologram module 200. In detail, the phosphorescent light is a phenomenon of photoluminescence that emits light slowly. When the phosphor layer 210 is illuminated by the light source 110 of the display device 10, the phosphor array structure 211 absorbs the energy of light to rise to an excited state. Then the phosphor array structure 211 is excited slowly to emit the phosphorescent light. When the phosphorescent light passes through the first barcode array 221a and the second barcode array 222a, a first image and a second image are generated, respectively. The first image and the second image are stacked with each other to be combined to form a holographic and chromatic image. When the power of the display device 10 exhausts or the display device 10 is at a power-saving mode, the interference from other light sources is reduced, and thus this optical effect of the hologram module 200 is more obvious for users to observe.

Since light with different wavelengths has dispersion, when white light mixed by the phosphorescent light or other light with other wavelengths passes through the rainbow hologram sheet 220, several holographic and chromatic images are generated from different point of views or different viewing angles. Hence, these cutting-edge holographic and chromatic images are able to increase the desire of consumers to buy the products with the display device 10.

In this embodiment, when the power of the display device 10 is completely exhausted or the display device 10 is in the power-saving mode, the phosphor layer 210 is able to be a light source of the hologram module 200. That is to say, the phosphor layer 210 can be considered a recharge battery for elongating the optical effect of the hologram module 200.

Furthermore, the time span of the phosphor layer 210 emitting the phosphorescent light correlates with a thickness and a concentration of the phosphor array structure 211. Thus, in order to elongate the emission of the phosphorescent light, the thickness of the phosphor array structure 211 can be increased or the concentration of the phosphor array structure 211 can be adjusted.

The following description shows a cup-shaped image for explaining the color match between the phosphor layer 210 and the rainbow hologram sheet 220. Please refer to FIG. 5 and FIG. 7, FIG. 5 is an illustration of an image formed by the rainbow hologram sheet in FIG. 2, FIG. 6 is an illustration of an image formed by the phosphor layer in FIG. 2, and FIG. 7 is an illustration of a combined image formed by the phosphor layer and the rainbow hologram sheet in FIG. 2. As shown in FIG. 5, the shape of the image formed by the rainbow hologram sheet 220 is cup-shaped, and the color of the image are red R and white W, each represented in blocks. As shown in FIG. 6, the shape of the image formed by the phosphor layer 210 is also a cup-shaped, which corresponds to the image formed by the rainbow hologram sheet 220 shown in FIG. 5. Also, the colors of the image are white W, green G and Blue B, each represented in blocks. As shown in FIG. 7, the shape of the combined image formed by the phosphor layer 210 and the rainbow hologram sheet 220 also cup-shaped, but the combined image is able to display different colors which are combined by the phosphor layer 210 and the rainbow hologram sheet 220 according to actual requirement. For example, the colors in FIG. 7 are pink PI, yellow Y, purple PU and white W.

In the above-mentioned embodiment, only one display layer of the rainbow hologram sheet 220 is described, which is only for exemplary. In other embodiments, a rainbow hologram sheet 220 with more than two display layers are combined with the phosphor layer 210 for improving the color gamut and image quality of the holographic and chromatic images.

Figure 8:
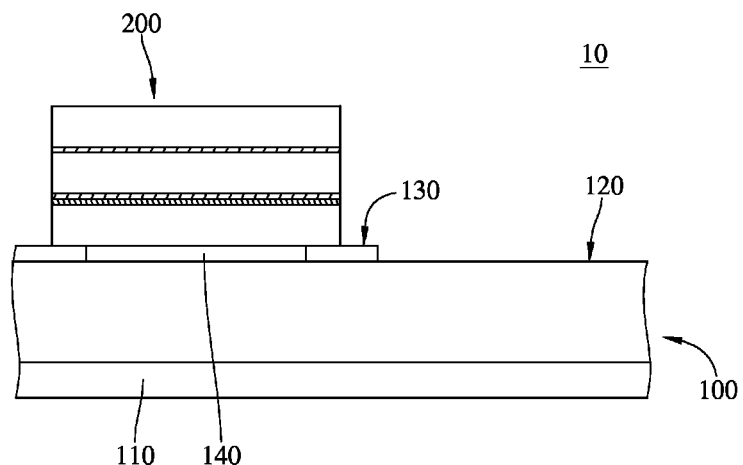
FIG. 8 is a schematic side view of a display device according to a second embodiment of the disclosure.

Please refer to FIG. 8, which is a schematic side view of a display device according to a second embodiment of the disclosure. In the embodiment illustrated in FIG. 1 through FIG. 7, the hologram module 200 is disposed on the display surface 120 of the display body 100, but the disclosure is not limited to this configuration. As shown in FIG. 8, in this embodiment, the hologram module 200 is disposed on the non-display surface 130 of the display body 100, e.g., an outer surface of a casing. In order to allow the light source 110 inside the display body 100 to illuminate the hologram module 200, an aperture 140 is formed on the non-display surface 130 of the display body 100. Hence, the light source 110 inside the display body 100 can illuminate the hologram module 200 through the aperture 140.

Furthermore, since the hologram module 200 is disposed on the non-display surface 130 of the display body 100, the holographic and chromatic images displayed by the hologram module 200 and the original images displayed by the display surface 120 of the display body 100 are divided to display separately. Thus, the holographic and chromatic images do not interfere with the original images.

Figure 9:
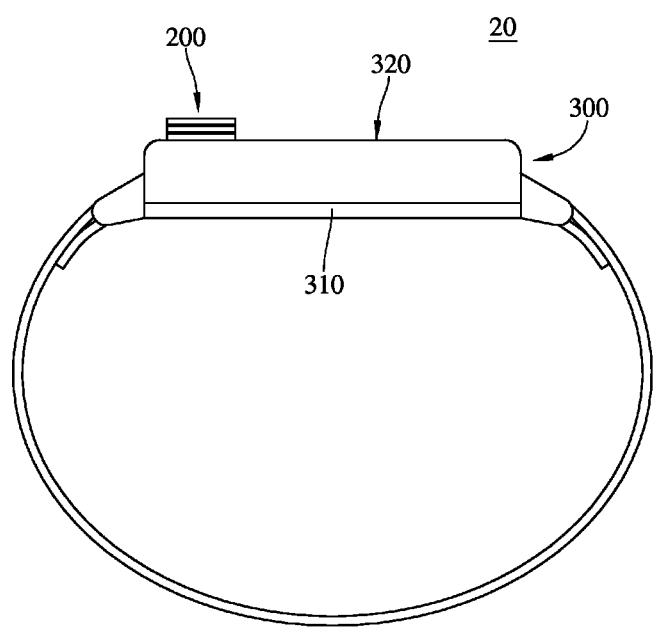
FIG. 9 is a schematic side view of a wearable device according to a third embodiment of the disclosure.
Figure 10:
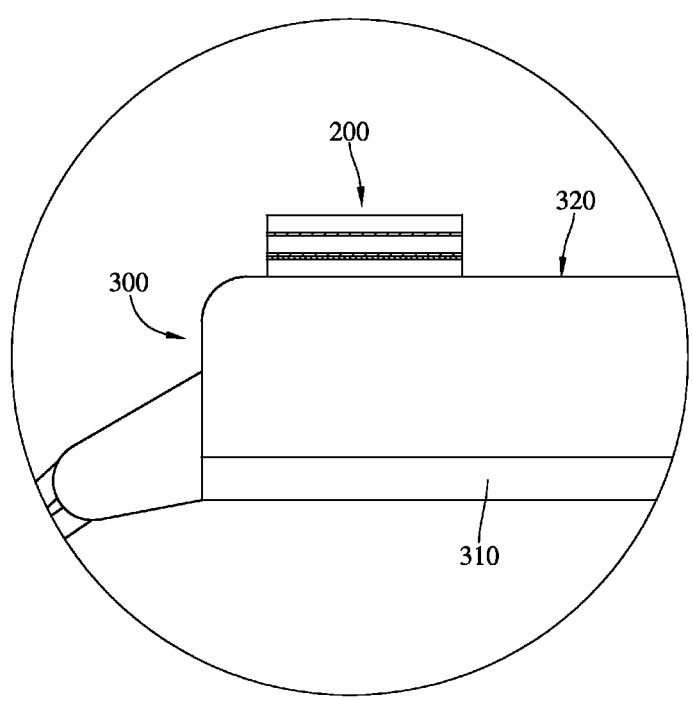
FIG. 10 is an exploded view of FIG. 9.

Please refer to FIG. 9 and FIG. 10, FIG. 9 is a schematic side view of a wearable device according to a third embodiment of the disclosure, and FIG. 10 is an exploded view of FIG. 9. In this embodiment, the wearable device 20 includes a display body 300 and a hologram module 200. For example, the display body 300 is a smart watch. In this embodiment, the display body 300 includes a display surface 320 and a light source 310. For example, the light source 310 is a back-light module or an AMOLED. The light source 310 is located inside the display body 300 and for illuminating the display surface 320. The hologram module 200 is disposed on the display surface 320 for receiving light emitted by the light source 310 of the display body 300. The configuration of the hologram module 200 is similar to that of the hologram module 200 shown in FIG. 1, so the repeated description is not described herein again.

In the embodiment shown in FIG. 9, the hologram module 200 is disposed on the display surface 320 of the display body 300, but the disclosure is not limited to this configuration. In other embodiments, the hologram module 200 is disposed on the non-display surface with the aperture of the display body, which is similar to the embodiment shown in FIG. 8.

According to the hologram module, the display device with the hologram module, the wearable device with the hologram module of the embodiments of the disclosure, the rainbow hologram sheet with two display layers meets with the phosphor layer so as to form a holographic and chromatic image with enhanced color gamut. Accordingly, the holographic and chromatic image displayed by the hologram module is able to increase the demand of the consumers in order to attract the consumers to purchase products with the hologram module.

What is claimed is:

1. A hologram module, comprising:
   a phosphor layer with a phosphor array structure; and
   a rainbow hologram sheet, comprising:
      a first display layer disposed on the phosphor layer and having a first barcode array corresponding to the phosphor array structure, wherein the first barcode array stores information of a first digital barcode corresponding to a holographic and chromatic image; and
      a second display layer disposed on and contacting the first display layer and having a second barcode array corresponding to the first barcode array, wherein the second barcode array stores information of a second digital barcode corresponding to the holographic and chromatic image;
   wherein, the phosphor array structure, the first barcode array and the second barcode array are chromatic, a color of the phosphor array structure meets with a color combined by the first barcode array and the second barcode array so as to display the hologram image converted from light emitted by the phosphor array structure via the first barcode array and the second barcode array.

2. The hologram module according to claim 1, further comprising a light source for emitting visible light or ultra-violet light onto the first barcode array and the second barcode array, the visible light or the ultraviolet light being for passing through a grating to form at least the first digital barcode, and the first digital barcode being printed on a substrate that is pervious to light by laser.

3. The hologram module according to claim 2, wherein a diameter of the grating is less than 260 nanometers (nm) and larger than zero.

4. A display device, comprising:
   a display body with a light source; and
   a hologram module, comprising:
      a phosphor layer disposed on the display body and having a phosphor array structure corresponding to the light source; and
      a rainbow hologram sheet, comprising:
         a first display layer disposed on the phosphor layer and having a first barcode array corresponding to the phosphor array structure, wherein the first barcode array stores information of a first digital barcode corresponding to a holographic and chromatic image; and a second display layer disposed on and contacting the first display layer and having a second barcode array corresponding to the first barcode array, wherein the second barcode array stores information of a second digital barcode corresponding to the holographic and chromatic image;

wherein, the phosphor array structure, the first barcode array and the second barcode array are chromatic, a color of the phosphor array structure meets with a color combined by the first barcode array and the second barcode array, the light source is for emitting light to excite the phosphor array structure to emit phosphorescent light that illuminates the first barcode array and the second barcode array to display the holographic and chromatic image.

5. The display device according to claim 4, wherein the display body has a display surface and a non-display surface, the non-display surface is located at a periphery of the display surface, and the phosphor layer is disposed on the display surface of the display body.

6. The display device according to claim 4, wherein the display body has a display surface, a non-display surface and an aperture, the non-display surface is located at a periphery of the display surface, and the aperture is formed on the non-display surface and exposes the light source, the phosphor layer is disposed on the non-display surface of the display body and covers the aperture such that the light source of the display body is for emitting light passing through the aperture to illuminate the phosphor layer.

7. A wearable device, comprising:
a display body with a light source; and
a hologram module, comprising:
  a phosphor layer having a phosphor array structure corresponding to the light source; and
  a rainbow hologram sheet, comprising:
    a first display layer disposed on the phosphor layer and having a first barcode array corresponding to the phosphor array structure, wherein the first barcode array stores information of a first digital barcode corresponding to a holographic and chromatic image; and
    a second display layer disposed on and contacting the first display layer and having a second barcode array corresponding to the first barcode array, wherein the second barcode array stores information of a second digital barcode corresponding to the holographic and chromatic image;

wherein the phosphor array structure, the first barcode array and the second barcode array are chromatic, a color of the phosphor array structure meets with a color combined by the first barcode array and the second barcode array, the light source is for emitting light to excite the phosphor array structure to emit phosphorescent light that illuminates the first barcode array and the second barcode array to display the holographic and chromatic image.

8. The wearable device according to claim 7, wherein the display body has a display surface and a non-display surface, the non-display surface is located at a periphery of the display surface.

9. The wearable device according to claim 8, wherein the phosphor layer is disposed on the display surface.

10. The wearable device according to claim 8, wherein the non-display surface has an aperture through which the light emitted by the light source passes, the phosphor layer is disposed on the non-display surface and covers the aperture such that the light emitted by the light source illuminates the phosphor layer.

11. A hologram module, comprising:
a phosphor layer with a phosphor array structure; and
a rainbow hologram sheet, comprising:
  a display layer with two opposite sides disposed on the phosphor layer and having a first barcode array on one side corresponding to the phosphor array structure and a second barcode array on another side corresponding to the first barcode array, wherein the first barcode array stores information of a first digital barcode corresponding to a holographic and chromatic image and wherein the second barcode array stores information of a second digital barcode corresponding to the holographic and chromatic image;

wherein, the phosphor array structure, the first barcode array and the second barcode array are chromatic, a color of the phosphor array structure meets with a color combined by the first barcode array and the second barcode array so as to display the hologram image converted from light emitted by the phosphor array structure via the first barcode array and the second barcode array.

* * * * *